United States Patent
Penzo et al.

(10) Patent No.: US 7,414,095 B2
(45) Date of Patent: Aug. 19, 2008

(54) LIQUID PHASE PROCESS FOR POLYMERIZING OLEFINS

(75) Inventors: Giuseppe Penzo, Mantova (IT); Daniele Bigiavi, Bologna (IT); Massimo Covezzi, Ferrara (IT); Maria Silvia Tonti, Ferrara (IT); Anna Fait, Ferrara (IT); Pietro Baita, Rovigo (IT)

(73) Assignee: Basell Polioefine Italia s.r.l., Milan (IT)

( * ) Notice: Subject to any disclaimer, the term of this patent is extended or adjusted under 35 U.S.C. 154(b) by 0 days.

(21) Appl. No.: 10/581,981

(22) PCT Filed: Nov. 29, 2004

(86) PCT No.: PCT/EP2004/013550

§ 371 (c)(1),
(2), (4) Date: Jun. 7, 2007

(87) PCT Pub. No.: WO2005/058979

PCT Pub. Date: Jun. 30, 2005

(65) Prior Publication Data

US 2007/0265401 A1     Nov. 15, 2007

Related U.S. Application Data

(60) Provisional application No. 60/529,990, filed on Dec. 16, 2003.

(30) Foreign Application Priority Data

Dec. 11, 2003    (EP)   ................................ 03104656

(51) Int. Cl.
*C08F 10/08* (2006.01)
*C08F 6/06* (2006.01)

(52) U.S. Cl. .................... 525/383; 525/384; 526/124.2; 526/348.6

(58) Field of Classification Search ................. 525/383, 525/384; 526/124.2, 348.6
See application file for complete search history.

(56) References Cited

U.S. PATENT DOCUMENTS

| 3,337,519 | A | 8/1967 | Ledbetter et al. |
| 3,356,666 | A | 12/1967 | Rosen et al. |
| 3,362,943 | A | 1/1968 | Edwards et al. |
| 4,399,054 | A | 8/1983 | Ferraris et al. |
| 4,701,489 | A | 10/1987 | Hughes et al. |
| 7,160,964 | B2 * | 1/2007 | Bigiavi et al. ............... 526/142 |

FOREIGN PATENT DOCUMENTS

| EP | 225099 | 11/1986 |
| GB | 1051680 | 6/1955 |
| WO | 04/000895 | 12/2003 |

* cited by examiner

*Primary Examiner*—Caixia Lu
(74) *Attorney, Agent, or Firm*—Jarrod N. Raphael

(57) ABSTRACT

A solution process for polymerizing one or more α-olefins of the formula $CH_2=CHR$, where R is H or an alkyl radical $C_1$-$C_{18}$, to produce a polymer that is soluble in the reaction medium, comprising the steps of:
continuously polymerizing in a liquid phase the α-olefin in the presence of a catalyst system based on a transition metal compound to obtain a solution of polymer in the reaction medium;
the polymeric solution obtained from step a) is then mixed in one or more mixing stages with an aqueous mixture comprising one or more organic compounds having at least a hydroxy or epoxy group, said aqueous mixture having a dynamic viscosity at 30° C. higher than 50 cP (centiPoise).

27 Claims, 2 Drawing Sheets

LIQUID PHASE PROCESS FOR POLYMERIZING OLEFINS

The present invention relates to a liquid-phase process for the polymerization of α-olefins. In particular, the present invention relates to a solution process for the polymerization of α-olefins, especially butene-1, followed by a post-polymerization step in which the catalyst residues are deactivated with a high efficiency.

Butene-1 (co)polymers are well known in the art and are mainly used in the manufacture of molded products such as pipes, packaging films, adhesives.

Hitherto, butene-1 (co)polymers have been mainly produced by a solution or slurry polymerization process in the presence of coordination catalysts which are generally referred to as Ziegler-Natta catalysts. When a solution process is adopted, the polymerization is generally carried out in liquid butene-1 at conditions under which a solution of polybutene in butene-1 is discharged from the polymerization reactor. When a slurry polymerization is adopted, the polymerization is carried out in liquid butene-1 at conditions under which the polymer is produced as a solid, thus obtaining a slurry of solid polymer in butene-1. In both cases, an additional step is required wherein the obtained polymer is separated from the monomer, which is recovered and recirculated to the reactor. Several generations of Ziegler-Natta catalysts have been used in the production of isotactic polyolefins, such as polypropylene or polybutene. A former generation of Ziegler-Natta catalysts employed in the polymerization of butene-1 is based on $TiCl_3$ as the catalyst component. Butene-1 (co)polymers have been prepared by polymerizing butene-1 in the presence of $TiCl_3$-based catalysts and a dialkyl aluminum halide as the cocatalyst. In view of the relatively low activity of said catalyst systems, the obtained polymer has a high content of catalyst residues (generally more than 300 ppm of Ti). Such a high content of catalyst residues is detrimental to the final properties of the polymers, so as a deashing step is required for extracting the catalyst residues from the polymer. The deashing step is generally carried out in a deashing chamber by contacting the solution or slurry containing polybutene with caustic water. Afterwards, catalyst salts and water are separated from the polymeric phase by gravity in a settler: catalyst salts and water are then discharged from the settler, so that the content of catalyst residues in the polybutene solution or slurry is minimized. This deashing step involves the use of a large amount of liquids and increases the complexity of the reaction plant. Furthermore, a complete separation of the water from the polymeric phase is hardly achievable in the settling step and droplets of water remain unsettled in the polymer solution.

The above problems have been overcome by using a more recent generation of stereospecific Ziegler-Natta catalysts, which have been developed particularly for the production of isotactic polypropylene. These catalysts typically comprise a support of magnesium chloride combined with $TiCl_4$ and an electron donor, such as ethyl benzoate. The cocatalyst is again an aluminum alkyl, preferably an aluminum trialkyl compound. When α-olefins of three or more carbon atoms are polymerized in the presence of said catalysts, stereoregular polymers are obtained with a high polymerization yield. In view of the high activity, the content of catalyst residues in the polymerization product is drastically reduced. Generally, the final polymer contains less than 20 ppm of Ti. As a consequence, the removal of catalyst residues from the polymer can be omitted, thus making simpler the process setup and reducing the operating costs.

However, a liquid-phase polymerization of butene-1 necessarily requires the separation of the obtained polybutene from the unreacted monomer. The monomer recovery is generally carried out in a separation step wherein high temperatures, of about 150-250° C., are required. Before such a separation step, a deactivation of the catalyst residues is therefore necessary in order to avoid an undesired modification of the properties of the final polymer due to a further uncontrolled polymerization and/or a thermal degradation of the polymer. Unless the catalyst is deactivated, the final pellets could have a higher melt index and a different molecular weight distribution with respect to the polymer obtained at the outlet of the polymerization step. Such a melt index shift should be prevented in order to obtain a final polymer having the desired properties.

The methods known in the art generally refer to a deactivation of the catalyst carried out by introducing a deactivator compound during the polymerization step. For instance, in a multi-stage polymerization process for producing an impact copolymer composition, the relative proportions of homopolymer phase and copolymer phase can be controlled by the addition of suitable catalyst deactivators, which kill or reduce the catalyst activity. Such catalyst deactivators are generally introduced at a point situated between the first and the second polymerization reactor or directly into the second polymerization reactor. An example of this deactivation method is given in EP 225 099 in which propylene-ethylene block copolymers having well-balanced qualities, such as high-impact properties, stiffness and processability, are said to be obtained by introducing a polyalkylene glycol ether as a catalyst deactivator between the first and second polymerization step. As a consequence of this addition, the catalyst activity in the second stage polymerization catalyst is reduced from 30% to 80%.

When a liquid phase polymerization of an α-olefin has to be followed by the separation of the obtained polymer from the unreacted α-olefin, as for the polymerization of butene-1, the prior art teachings are not satisfactory in order to solve the problems correlated to the deactivation of the catalyst system.

It is known the use of low molecular weight gases or liquids in order to reduce the catalyst activity to a level where the polymerization stops. The use of water as a Ziegler-Natta catalyst killer is disclosed in U.S. Pat. No. 4,701,489 that refers to a method of deactivating catalyst residues in amorphous polyalphaolefins, such as amorphous propylene homo- and copolymers. After a bulk polymerization process and a separation of the unreacted monomers from the molten polyalphaolefin, a deactivation of the catalyst residues contained in the molten polyalphaolefin is described. According to this patent, the deactivation is carried out by contacting the molten amorphous polyalphaolefin with at least 3 moles of water per mole of aluminum present in the polymer.

Water and similar low-boiling compounds, such as $CO_2$ and alcohols, are recognized to be high-efficiency deactivators of Ziegler-Natta catalysts. However, a solution process for polymerizing butene-1 gives rise to a highly viscous solution of polybutene-1 in butene-1. The polymer solution withdrawn from the polymerization reactor is generally endowed with a dynamic viscosity of about 1000-100000 cP. On the other hand, the dynamic viscosity of water and similar low-boiling compounds used as killing agents is generally in the range of 1-10 cP.

As a consequence, the polymeric solution and such deactivators differ in viscosity by several orders of magnitude, so that, also providing a vigorous mixing between the two components, a mutual contact is hardly achieved so that the mixing is not efficient and uniform. Therefore, water and similar low-viscosity organic compounds fall in reaching uniformly all the catalyst sites into the highly-viscous polymeric solution and thus fail in deactivating efficiently the catalyst.

In view of the above drawbacks, it would be desirable to provide a process for continuously deactivating, with a high efficiency, the catalyst residues contained in a high-viscosity polymeric solution obtained by a liquid-phase polymerization of an α-olefin. The Applicant has surprisingly found that the use, downstream the polymerization reactor, of a specific deactivating mixture improves the deactivation of the catalyst in a highly-viscous polymeric solution, without causing any worsening in the final properties of the obtained polymer.

It is therefore an object of the present invention a solution process for polymerizing one or more α-olefins of the formula $CH_2=CHR$, where R is H or an alkyl radical $C_1$-$C_{18}$, to produce a polymer that is soluble in the reaction medium, comprising the steps of:

a) continuously polymerizing in a liquid phase the α-olefin in the presence of a catalyst system based on a transition metal compound to obtain a solution of polymer in the reaction medium;

b) the polymeric solution obtained from step a) is then mixed in one or more mixing stages with an aqueous mixture comprising one or more organic compounds having at least a hydroxy or epoxy group, said aqueous mixture having a dynamic viscosity at 30° C. higher than 50 cP (centiPoise).

Figure 1:
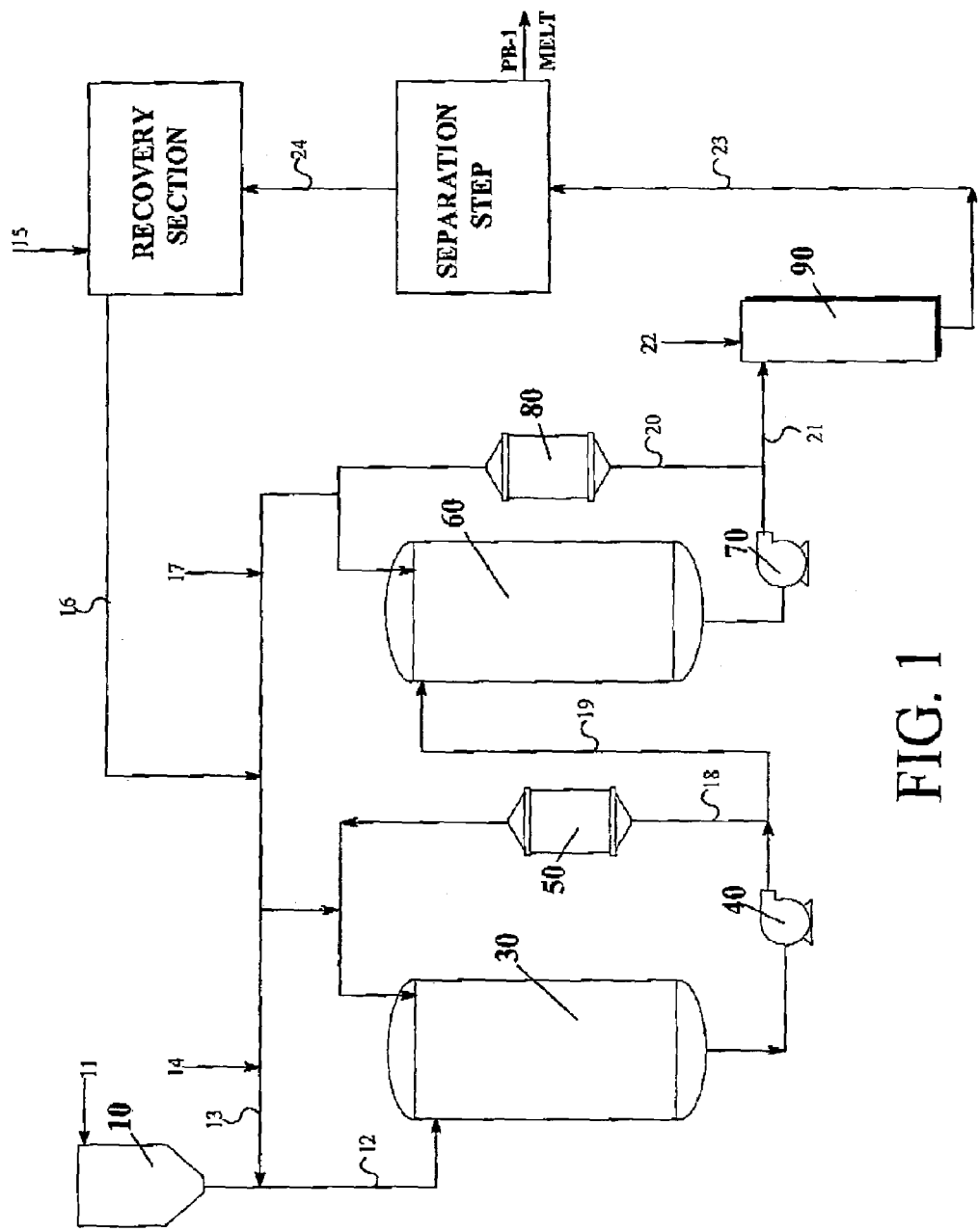
FIG. 1 shows an embodiment of a liquid-phase process of the present invention.

The process of the present invention will be described in detail with reference to a solution process for homo- or co-polymerizing butene-1, wherein a solution of polybutene-1 (PB-1) in the reaction medium is obtained from step a).

The polymerization step a) takes place in liquid phase in the presence or absence of an inert hydrocarbon solvent. Suitable solvents can be liquid hydrocarbons having from 5 to 10 carbon atoms, such as pentane, hexane, heptane, octane, etc. Preferably liquid butene-1 is used as the reaction medium in the process of the invention: the solution process is feasible since polybutene-1 can dissolve in butene-1 at relatively low pressures. Furthermore, the two components of the solution perfectly mix together at the optimum working temperatures of Ziegler-Natta and metallocene catalysts. In order to obtain the best performance of the catalyst together with a complete miscibility of monomer and polymer, the polymerization temperature in step a) is generally kept at a value comprised in the range of from 65 to 85° C., while the pressure is generally comprised between 8 and 40 bar. Preferred operating conditions are at temperatures of from 70 to 80° C. and at a pressure comprised between 12 and 25 bar.

The presence of a highly active catalyst of the Ziegler-Natta or metallocene type is involved in step a). A high polymerization yield is thus achieved, in the order of 8-200 kg of PB-1 for gram of catalyst. Accordingly, the amount of catalyst residues in the obtained polybutene-1 is negligible, generally lower than 120 ppm, and do not adversely affect the quality of the final polymer. A product of high industrial value having an excellent hue and strength is obtained without carrying out any removal of the catalyst residues from the polymer.

It is preferred to carry out a pre-contact of the catalyst components in a pre-contacting pot. A transition metal compound, an aluminum alkyl compound and optionally an electron donor compound are brought into contact at a temperature lower than 60° C., preferably comprised between 0 and 20° C. The catalyst system formed in the pre-contacting pot is then transferred to the first polymerization reactor. Optionally a pre-polymerization step can be interposed between the pre-contact of the catalyst components and the polymerization reactor.

The polymerization step a) can be performed in one or more continuously stirred tank reactors, in which a high-viscosity polymeric solution of polybutene-1 in butene-1 is obtained. It is preferred to carry out the polymerization under such conditions that the concentration of the polymer in the solution does not become unduly high, as otherwise the polymeric solution would become too viscous and thus difficult to stir and/or to process. The concentration of polybutene-1 is suitably kept to a value of less than 35% by weight. In fact, a further increase of the polymer concentration would make the viscosity of the polymeric solution too high and the stirring device of the reactors could be blocked. Low concentrations are quite easy to process but uneconomic due to the low productivity of the plant and the high influence of utilities costs. Therefore, the polymerization is preferably conducted in such a way that the concentration of polybutene-1 in butene-1 is comprised between 10 and 30% by weight, more preferably between 20 and 30% by weight.

Optionally in step a) butene-1 may be polymerized in the presence of up to 20% by weight, preferably 0.5-10% by weight, based on butene-1, of another α-olefin. Suitable comonomers are, for instance, ethylene, propylene, pentene-1 and hexene-1.

In the case of multiple stirred reactors arranged in series, different working conditions can be adopted in each reactor, as regards the concentration of molecular weight regulator, monomer, comonomer. Accordingly, polybutene-1 of different average molecular weight can be obtained in each stirred reactor, thus leading to a final product having a broad molecular weight distribution (MWD). Hydrogen can be advantageously used to control the polymer molecular weight. The use of $H_2$ as a chain transfer agent increases the catalytic activity of the polymerization process.

The total residence time in polymerization step a) is generally comprised between 1 and 4 hours, preferably between 2 and 3 hours.

The above specified values of temperature must be maintained inside each reactor by means of a suitable cooling system. In order to balance the heat produced by the polymerization reaction, a heat exchange unit is placed along the recycle loop to the reactor. According to an embodiment, the solution of polybutene in butene-1 can be withdrawn from the bottom of the stirred reactor by means of a suitable pump for high viscosity fluids, such as a gear pump or a screw pump, and then the major portion thereof is passed through the heat exchanger unit to remove heat of reaction and returned to the reactor. The remaining portion is directly fed to the successive polymerization reactor.

In spite of the high temperature of polymerization, the polymer solution coming from the last stirred tank reactor shows high values of viscosity. Specifically, a polymeric solution having a temperature in the range of 65-85° C. and a dynamic viscosity in the range of 1000-80000 cP is fed to the deactivation step b).

According to the process of the invention, an aqueous mixture satisfying particular conditions is used as the catalyst killer. As pointed out, said mixture comprises water and one or more high-viscosity organic compounds having at least a hydroxy or epoxy group, so that the dynamic viscosity of the mixture, measured at 30° C., is of at least 50 cP, preferably higher than 90 cP. The components of this deactivating mixture are mixed together in a separated vessel at a temperature generally comprised in the range 25-45° C. The dynamic viscosity of the obtained mixture is then checked to be higher than 50 Cp at the established temperature of 30° C. before the feeding to the deactivation step b).

After an extensive investigation, our researchers have observed that the use of the above deactivating mixture gives remarkable advantages as regards the catalyst deactivation of a highly viscous polymeric solution.

Suitable organic compounds to be mixed with water in order to form the above mixture comprise an aliphatic long-chain portion and at least a hydroxy or epoxy group. The presence of this aliphatic long-chain portion is advantageous in promoting the conveyance and diffusion of the hydroxy or epoxy groups into the highly viscous polymeric solution. Furthermore, the hydroxy or epoxy groups of said organic compounds can easily form a bond with the hydroxy groups of the water: in this way the catalyst sites throughout the polymeric solution are easily reached by the —OH groups of water and are efficiently and uniformly deactivated.

Suitable organic compounds satisfying the above conditions are, for instance:

high viscosity polyalcohols, such as dipropylen glycol, glycerol;

hydroxyesters, such as sorbitan monolaurate, sorbitan monooleate, glycerol monostearate;

alkyldiethanolammines of formula R—N(CH$_2$CH$_2$OH)$_2$ wherein R is an alkyl radical comprised between 10 and 20 carbon atoms, preferably between 12 and 18 carbon atoms;

polyepoxydate oils such as epoxidate linseed oil and epoxidate soya oil; representative compounds are products sold under the trademarks Edenol D82® and Edenol B316®.

A preferred component of the above mixture is a commercial product sold under the trademark ATMER163® (mixture of alkyldiethanolammines of formula R—N(CH$_2$CH$_2$OH)$_2$ where R is an alkyl radical C$_{12}$-C$_{18}$). The molar fraction of said alkyldiethanolammines in said aqueous mixture is preferably comprised in the range of from 0.1 to 0.4.

The catalyst system used in the polymerization step a) is preferably a Ziegler-Natta catalyst comprising a Ti-based compound as the solid catalyst component, and an Aluminum alkyl compound as the activator. The aqueous mixture of the present invention shows a high efficiency in deactivating such a catalyst system, even if small amounts thereof are used. In fact, it is sufficient a ratio between moles of aqueous mixture (water+organic compounds) and moles of Al higher than 2.0, preferably comprised between 2.5 and 4.0, to attain a satisfactory deactivation of the catalyst residues in step b).

An efficient deactivation of the catalyst residues in step b) needs not only a simple addition of the aqueous mixture to the polymeric solution coming from the polymerization, but also a vigorous and effective mixing of the components in order to favour an intimate contact of all the components. This intimate mixing can be achieved in one or more mixing tanks placed in series or, alternatively, in a single deactivation apparatus equipped with a sequence of more mixing stages where a high shear rate is established.

According to a preferred embodiment of the invention, a specific apparatus has been employed in order to ensure an intimate contact between the polymeric solution of PB-1 in butene-1 and the above aqueous mixture. This apparatus comprises a stirring shaft provided with impellers in a number comprised between 2 and 20, preferably between 4 and 12: as a consequence, more mixing stages are formed along the shaft of the apparatus by the rotation of each impeller. The impellers are equipped with radial blades fixed at the stirring shaft, said radial blades causing a radial flow inside each mixing stage. The polymeric solution and the aqueous mixture are continuously fed at the inlet of this apparatus and slowly flow through the sequence of mixing stages. Said multistage vigorous stirring gives rise to a high-shear field, so that an intimate contact and mixing of the components are achieved: baffles are provided along the vertical wall of the apparatus in order to increase the shear rate. A radial flow is caused by the rotation of the blades, and simultaneously the polymeric solution moves along the shaft of the apparatus with a piston-like flow passing from a mixing stage to the successive one. Both the radial and axial flow contributes to improve the mixing of the components and, consequently the deactivation of the catalyst residues.

After the deactivation of the catalyst residues (step b), the solution of polybutene in butene-1 is passed to a separation step, wherein the polybutene-1 is separated from the unreacted monomer, which is recovered and re-circulated to the polymerization step a). The removal of the unreacted monomer from the polymer can be carried out according to methods known in the art. A melt devolatilization technique is preferably adopted, by means of one or more volatilization chambers operating at a decreasing pressure. For instance, two volatilizers placed in series can be used, the first one operating under pressure and the second one operating under vacuum: by this technique a polybutene melt substantially free of monomer is obtained. Afterwards, the polymer melt is compounded forcing it to flow inside a static mixer to which the master batch is added.

The above mentioned objects and advantages of the present invention will become evident from the following description of the accompanying drawings. It is to be understood that the enclosed drawings have only an illustrative purpose, not restrictive of the scope of the invention.

One preferred embodiment of the process of the invention is described in detail with reference to FIG. 1. A transition metal compound, an aluminum alkyl compound and optionally an electron donor compound are fed via line 11 to a pre-contacting pot 10. The catalyst system formed in the pre-contacting pot is then transferred via line 12 to a first continuously stirred tank reactor 30 together with a stream 13 containing butene-1, hydrogen and optionally comonomers. Hydrogen and comonomers are fed to the reactors through line 14 and 17, while liquid butene-1 is introduced by means of lines 15 and 16. In particular, the monomer coming from the recovery section is provided by line 16, while fresh butene-1 is fed by line 15.

The polymerization step a) takes place in two continuously stirred tank reactors 30 and 60. The operating conditions in the two reactors are selected as above specified and a high-viscosity solution of polybutene-1 is formed in both the reactors.

Lines 14 and 17 can provide a different amount of H$_2$ as well as different types and amounts of comonomers, so that butene-1 (co)polymers with a different composition and different average molecular weight can be produced in the reactors 30 and 60. This 2-stage bimodal polymerization has the advantage of modulating the polymerization in the two reactors so as to produce a final product having the desired breadth of molecular weight distribution (MWD), also tailoring the other polymer properties, such as melting point, flexural modulus, etc.

The hydrogen concentration in the first reactor 30 is generally kept at a level lower than the hydrogen concentration in the second reactor 60. As a consequence, the first reactor produces butene-1 polymers having a melt flow index generally lower than the melt index of the polymers obtained in the second reactor.

The obtained solution of polybutene in butene-1 is withdrawn from the bottom of reactor 30 by means of a gear pump 40. A part of the polymeric solution is fed via line 18 to a heat exchanger 50 and then returned to reactor 30. The remaining part is directly fed via line 19 to the second polymerization reactor 60. The solution of polybutene in butene-1 is withdrawn from the bottom of reactor 60 by means of a gear pump 70: a part of the polymeric solution is fed via line 20 to a second heat exchanger 80 and then returned to reactor 60. The remaining part of the polymeric solution is directly fed via line 21 to the top of the deactivation apparatus 90 for the killing of the catalyst residues. At the same time, an aqueous mixture as defined in step b) is continuously fed via line 22 to the top of the deactivation apparatus 90. The polymeric solution, once deactivated, is withdrawn from the bottom of the deactivation apparatus 90 and fed to the separation section via line 23. In the separation section a polybutene melt is separated from the unreacted monomer by means of two volatilization chambers (not shown in FIG. 1) operating at a decreasing pressure.

The high-viscosity organic compounds contained in the aqueous mixture of step b) are mostly separated from the unreacted butene-1 into the two volatilization chambers, so that they remain entrapped inside the polybutene-1 melt. If not separated, these compounds follow line 24 and are then separated by distillation from the unreacted butene-1 in the recovery section. The obtained polybutene-1 melt is then compounded with suitable additives and subjected to an underwater pelletization (not shown in FIG. 1).

Figure 2:
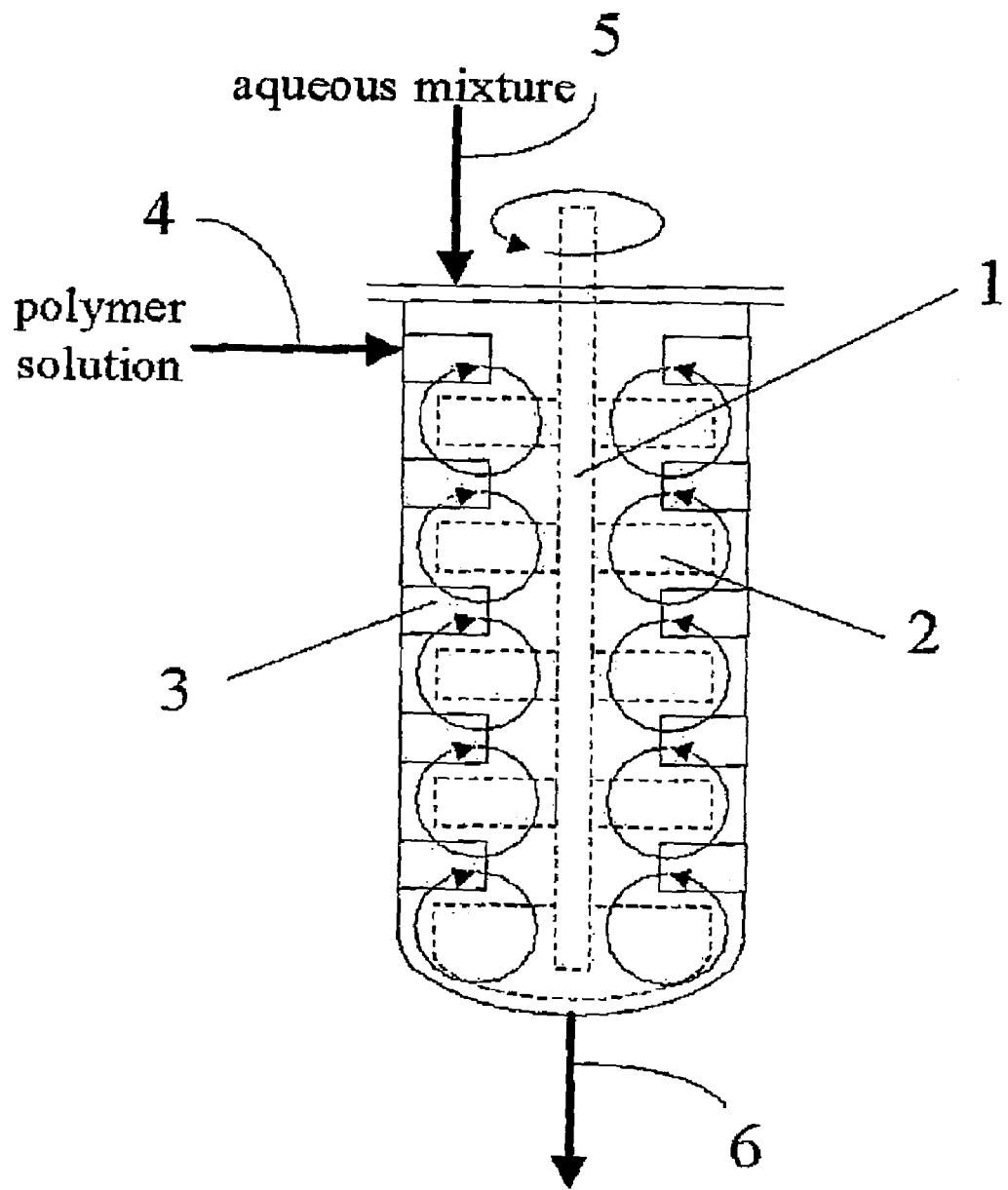
FIG. 2 shows an embodiment of a deactivation apparatus used in a liquid-phase process of the present invention.

A preferred embodiment of the deactivation apparatus used in the process of the invention is shown in FIG. 2. The apparatus comprises a stirring shaft 1 provided with impellers equipped with radial blades 2. Mixing stages are formed along the shaft by the rotation of each impeller. Baffles 3 are provided along the vertical wall of the apparatus in order to increase the shear rate. The polymeric solution 4 and the aqueous mixture 5 are continuously introduced at the top of the apparatus and slowly flow through the sequence of mixing stages. Together with the radial flow imposed by the rotation of the blades inside each mixing stage, also an axial piston-like flow is achieved along the shaft. The deactivated polymer solution 6 is withdrawn from the bottom of the apparatus and passed to the separation step.

The Ziegler-Natta catalysts used in the polymerization step a) comprise a titanium compound supported on magnesium chloride in active form and an alkylaluminum compound as the cocatalyst. When an internal electron-donor compound is used, also a high stereospecificity is achieved.

The preferred titanium compounds are $TiCl_4$ and $TiCl_3$. Also Ti-haloalcoholates of formula $Ti(OR)_{n-y}X_y$, where n is the valence of titanium and y is a number between 1 and n, can be used. The internal electron-donor compound may be selected from esters, ethers, amines and ketones. It is preferably selected from alkyl, cycloalkyl or aryl esters of monocarboxylic acids, for example benzoic acid, or polycarboxylic acids, for example phthalic or malonic acid, the said alkyl, cycloalkyl or aryl groups having from 1 to 18 carbon atoms. Examples of said electron-donor compounds are methyl benzoate, ethyl benzoate and diisobutyl phthalate. Generally, the internal electron donor compound is used in molar ratio with respect to the $MgCl_2$ of from 0.01 to 1, preferably from 0.05 to 0.5.

The alkyl aluminum compound is preferably chosen among trialkyl aluminum compounds, such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

The external donor can be of the same type or it can be different from the internal donor described above. Suitable external electron donor compounds include silicon compounds, ethers, esters, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are the silicon compounds in which a is 0, c is 3, $R^6$ is branched alkyl or cycloalkyl group, optionally containing heteroatoms, and $R^7$ is methyl. Examples of such preferred silicon compounds are cyclohexyltrimethoxysilane, t-butyltrimethoxysilane and thexyltrimethoxysilane. The electron donor compound is used in such an amount to give a molar ratio between the organoaluminum compound and said electron donor compound of from 0.1 to 500, preferably from 1 to 300 and more preferably from 3 to 100.

Also metallocene-based catalyst systems can be used in the polymerization step a) of the present invention and they comprise:

A) at least a transition metal compound containing at least one n bond;

B) at least an alumoxane or a compound able to form an alkylmetallocene cation; and C) optionally an organo-aluminum compound.

A preferred class of metal compound containing at least one n bond are metallocene compounds belonging to the following formula (I):

$$Cp(L)_qAMX_p \qquad (I)$$

wherein

M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, —Me, —Et, -n-Bu, -sec-Bu, —Ph, —Bz, —$CH_2SiMe_3$, —OEt, —OPt, —OBu, —OBz and —$NMe_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7_2)_n$;

Z being C, Si, and the $R^7$ groups, equal to or different from each other, being hydrogen or a hydrocarbon radical containing from 1 to 40 carbon atoms;

more preferably L is selected from $Si(CH_3)_2$, $SiPh_2$, SiPhMe, $SiMe(SiMe_3)$, $CH_2$, $(CH_2)_2$, $(CH_2)_3$ or $C(CH_3)_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component B) are considered to be linear, branched or cyclic compounds containing at least one group of the type:

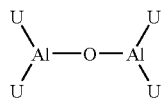

wherein the substituents U, same or different, are defined above.

In particular, alumoxanes of the formula:

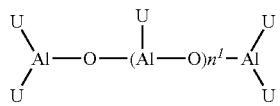

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

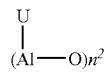

can be used in the case of cyclic compounds, wherein $n^2$ is an integer from 2 to 40 and the U substituents are defined as above.

The following examples have to be considered representative and non-limiting of the scope of the invention.

EXAMPLES

The following examples relate to some tests carried out in a pilot plant and aimed at evaluating the effectiveness of the deactivating mixture of the present invention when applied to a solution process for polymerizing butene-1.

The polymerization step a) was carried out into two continuously stirred tank reactors having a volume of 0.33 m³ placed in series according to the embodiment of FIG. 1. The catalyst residues were deactivated in a deactivation apparatus according to the embodiment of FIG. 2.

The polymerization was carried out in the presence of a catalyst comprising:

a solid catalyst component based on a Titanium compound;
triisobutylaluminum (TIBA) as a catalyst activator;
thexyltrimethoxysilane as a donor compound.

The Melt Flow Index of the obtained polybutene-1 was measured by using a weight of 2.16 Kg at 190° C. according to ISO 1133 (ASTM D1238 condition E).

Preparation of the Solid Catalyst Component

Into a 500 ml four-necked round flask, purged with nitrogen, 225 ml of $TiCl_4$ were introduced at 0° C. While stirring, 6.8 g of microspheroidal $MgCl_2$ 2.7$C_2H_5OH$ (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh $TiCl_4$ were added, the mixture was reacted at 120° C. for one hour, then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Example 1

Polymerization 0.5 g/h of the above solid catalyst component (corresponding to 0.15×10⁻³ mol/h of Ti), 45 g/h of TIBA (corresponding to 0,22 mol/h of Al) and 0.3 g/h of thexyltrimethoxy-silane were pre-contacted in hexane at 15° C. for 10 minutes before the feeding to the first reactor. Liquid butene-1 together with $H_2$ as a molecular weight regulator were continuously fed to the polymerization reactors. The polymerization conditions in the first and second reactor are reported in Table 1 as well as the feeding ratio $H_2/C_4H_8$.

TABLE 1

| Polymerization conditions | -1$^{st}$ Reactor | 2$^{nd}$ Reactor |
|---|---|---|
| Temperature (° C.) | 70 | 75 |
| Pressure (bar) | 20 | 20 |
| Residence Time (min) | 160 | 80 |
| $H_2/C_4H_8$ (ppm weight) | 2 | 80 |

A solution of polybutene in butene-1 having a polymer concentration of 25% by weight was continuously withdrawn from the second reactor at a flow rate of 160 kg/h. This means a polymer production of 40 kg/h and a catalyst activity of 80 kg of polymer for each gram of solid catalyst component.

A sample of polymeric solution was taken at the outlet of the second reactor in order to evaluate the Melt Index MIE of the obtained polybutene-1: a value of 0.40 was measured. Also the dynamic viscosity of the discharged polymeric solution was measured showing a value of about 8000 cP.

Deactivation

The solution of PB-1 in butene-1 was passed to the deactivation apparatus for the killing of the catalyst residues.

As a deactivator an aqueous solution was prepared by mixing at 30° C. water and ATMER163® (mixture of alkyldiethanolamines of formula R—N $(CH_2CH_2OH)_2$, wherein R is an alkyl radical $C_{12}$-$C_{18}$) with a molar ratio between the moles of ATMER163® and the total moles of aqueous solution of 0.25. The dynamic viscosity of said aqueous solution at 30° C. was measured giving a value of about of 96 cP.

56.6 g/h of the above aqueous solution (corresponding to 0.48 mol/h of $H_2O$ and 0.16 mol of ATMER163®) were continuously fed to the top of the deactivation apparatus together with 160 kg/h of polymeric solution. The ratio between moles of aqueous solution and moles of Al was of 2.9.

Separation and Monomer Recovery

After the deactivation step, the solution of polybutene in butene-1 was heated up to 210° C. and then transferred into two devolatilization chambers placed in series, the first one operating at 6 bar, the second one operating at 50 mbar.

A Polybutene-1 melt containing a negligible amount of alkyldiethanolamines was withdrawn from the bottom of the second volatilizer, while a gaseous mixture containing butene-1 was collected at the top of the first volatilizer. The unreacted monomer was then condensed before to be recycled to the polymerization section.

At the outlet of the second volatilizer, the PB-1 melt was additivated with Irganox 1010 as an antioxidant compound and then transferred to an underwater pelletizer. The Melt Index MIE of the obtained pellets was of 0.45. Accordingly, the process of the invention ensures a limited and negligible Melt Index shift and combines a high polymerization yield with a high efficiency in the deactivation of the catalyst residues.

Example 2

Polymerization 0.18 g/h of the solid catalyst component (corresponding to 0.054 $10^{-3}$ mol/h of Ti), 45 g/h of TIBA (corresponding to 0.22 mol/h of Al) and 0.5 g/h of thexyltrimethoxy-silane were pre-contacted in hexane at 15° C. for 10 minutes before the feeding to the reactors. $H_2$ was used as a molecular weight regulator. Liquid butene-1 and ethylene were continuously fed to the polymerization reactors according to the feeding ratios reported in Table 2. The polymerization conditions in the first and second reactor are reported in Table 2.

TABLE 2

| Polymerization conditions | -1$^{st}$ Reactor | 2$^{nd}$ Reactor |
| --- | --- | --- |
| Temperature (° C.) | 70 | 75 |
| Pressure (bar) | 24 | 24 |
| Residence Time (min) | 135 | 80 |
| $C_2H_4/C_4H_8$ (% wt) | 0.15 | 0.18 |
| $H_2/C_4H_8$ (ppm weight) | 11 | 200 |

A solution of a random copolymer (modified PB-1) in butene-1 having a polymer concentration of 17% by weight was continuously withdrawn from the second reactor at a flow rate of 155 kg/h. This means a polymer production of 26 kg/h and a catalyst activity of about 140 Kg of polymer for each gram of solid catalyst component.

A sample of polymeric solution was taken at the outlet of the second reactor in order to evaluate the Melt Index MIE of the obtained polybutene-1: a value of 0.75 was measured.

Also the dynamic viscosity of the discharged polymeric solution was measured showing a value of about 1000 cP.

Deactivation

The solution of modified PB-1 in butene-1 was passed to the deactivation apparatus for the killing of the catalyst residues.

As a deactivator an aqueous solution was prepared by mixing at 30° C. water and ATMER163® (mixture of alkyldiethanolamines of formula R—N $(CH_2CH_2OH)_2$, wherein R is an alkyl radical $C_{12}$-$C_{18}$) with a molar ratio between the moles of ATMER163® and the total moles of aqueous solution of 0.2. The dynamic viscosity of this aqueous solution at 30° C. was measured giving a value of about 93 cP.

44.6 g/h of the above aqueous solution (corresponding to 0.48 mol/h of $H_2O$ and 0.12 mol of ATMER163®) were continuously fed to the top of the deactivation apparatus together with 160 kg/h of polymeric solution. The ratio between moles of aqueous solution and moles of Al was of 2.72.

Separation and Monomer Recovery

After the deactivation step, the solution of polybutene in butene-1 was heated up to 210° C. and then transferred into two devolatilization chambers placed in series, the first one operating at 6 bar, the second one operating at 50 mbar.

A Polybutene-1 melt containing a negligible amount of alkyldiethanolamines was withdrawn from the bottom of the second volatilizer, while a gaseous mixture containing butene-1 was collected at the top of the first volatilizer. The unreacted monomer was then condensed before to be recycled to the polymerization section.

At the outlet of the second volatilizer, the PB-1 melt was additivated with Irganox 1010 as an antioxidant compound and then transferred to an underwater pelletizer. The measure of the Melt Index MIE of the obtained pellets was of 0.85 so that a negligible Melt Index shift was observed.

Example 3 (Comparative)

Polymerization

The polymerization of butene-1 was carried out according to the same conditions of example 1, so that a value of MIE=0, 40 was measured at the outlet of the second reactor.

Deactivation

The solution of PB-1 in butene-1 was passed to the deactivation apparatus for the killing of the catalyst residues.

As a deactivator an aqueous solution was prepared by mixing at 30° C. water and propyl alcohol with a molar ratio between the moles of propyl alcohol and the total moles of aqueous solution of 0.25. The dynamic viscosity of this aqueous solution at 30° C. was measured giving a value of about 0.5 cP.

18, 24 g/h of the above aqueous solution (corresponding to 0.48 mol/h of $H_2O$ and 0.16 mol/h of propyl alcohol) were continuously fed to the top of the deactivation apparatus together with 160 kg/h of polymeric solution. The ratio between moles of aqueous solution and moles of Al was of 2.9.

Separation and Monomer Recovery

The same operative conditions of Example 1 were carried out.

At the outlet of the second volatilizer, PB-1 melt was withdrawn and transferred to the underwater pelletizer. The Melt Index MIE of the obtained pellets was 1.0 so that a considerable shift of the melt index was observed.

This comparative example shows that an aqueous solution comprising an organic compound with an OH group, but having a low dynamic viscosity is unable to kill efficiently the catalyst sites of the highly viscous polymeric solution obtained from step a) of the present invention.

Example 4

Polymerization

The polymerization of butene-1 was carried out according to the same conditions of example 1, so that a value of MIE=0, 40 was measured at the outlet of the second reactor.

Deactivation

The solution of PB-1 in butene-1 was passed to the deactivation apparatus for the killing of the catalyst residues.

As a deactivator an aqueous solution was prepared by mixing at 30° C. water and glycerol [CH$_2$CH$_2$CH(OH)$_3$] with a molar ratio between the moles of glycerol and the total moles of aqueous solution of 0.5. The dynamic viscosity of this aqueous solution at 30° C. was measured giving a value of about 100 cP.

35.2 g/h of the above aqueous solution (corresponding to 0.32 mol/h of H$_2$O and 0.32 mol/h of glycerol) were continuously fed to the top of the deactivation apparatus together with 160 kg/h of polymeric solution. The ratio between moles of aqueous solution and moles of Al was of 2.9.

Separation and Monomer Recovery

The same operative conditions of Example 1 were carried out.

At the outlet of the second volatilizer, PB-1 melt was withdrawn and transferred to the underwater pelletizer. The Melt Index MIE of the obtained pellets was of 0.44, so that a negligible Melt Index shift was observed.

Example 5

Polymerization

The polymerization of butene-1 was carried out according to the same conditions of example 1, so that a value of MIE=0, 40 was measured at the outlet of the scone reactor.

Deactivation

The solution of PB-1 in butene-1 was passed to the deactivation apparatus for the killing of the catalyst residues.

As a deactivator an aqueous solution was prepared by mixing at 30° C. water and epoxidate linseed oil sold under the trademark Edenol D82® (molecular weight of 935) having an oxirane content (O$_2$% in the epoxy groups) of about 6.3% by wt.

The molar ratio between the moles of Edenol D82® and the total moles of aqueous solution was 0.22. The dynamic viscosity of this aqueous solution at 30° C. was measured giving a value of about 288 cP.

130 g/h of the above aqueous solution (corresponding to 0.48 mol/h of H$_2$O and 0.13 mol/h of Edenol D82®) were continuously fed to the top of the deactivation apparatus together with 160 kg/h of polymeric solution. The ratio between modes of aqueous solution and moles of Al was of 2.77.

Separation and Monomer Recovery

The same operative conditions of Example 1 were carried out.

At the outlet of the second volatilizer, PB-1 melt was withdrawn and transferred to the underwater pelletizer. The Melt Index MIE of the obtained pellets was of 0.48, so that a negligible Melt Index shift was observed.

The invention claimed is:

1. A solution process for polymerizing one or more α-olefins of formula CH$_2$=CHR, wherein R is H or a C$_1$-C$_{18}$ alkyl radical, wherein the solution process produces a polymer soluble in a reaction medium, comprising:
continuously polymerizing in a liquid phase an α-olefin in presence of a catalyst system comprising a transition metal compound to obtain a polymeric solution comprising a polymer in a reaction medium; and
then mixing in one or more mixing stages said polymeric solution with an aqueous mixture comprising one or more organic compounds having at least one hydroxy or epoxy group, said aqueous mixture having a dynamic viscosity at 30° C. higher than 50 cP.

2. The process according to claim 1, wherein said α-olefin is butene-1.

3. The process according to claim 1, wherein said polymeric solution comprises a mixture of polybutene-1 and butene-1.

4. The process according to claim 1, wherein said polymeric solution is obtained at a temperature ranging from 65 to 85° C.

5. The process according to claim 1, wherein said polymeric solution is obtained at a pressure ranging from 8 and 40 bar.

6. The process according to claim 1, wherein said polymeric solution is obtained in one or more continuously stirred tank reactors.

7. The process according to claim 3, wherein said concentration of polybutene-1 is less than 35% by weight.

8. The process according to claim 3, wherein said concentration of polybutene-1 ranges from 10 to 30% by weight.

9. The process according to claim 3, wherein said polymeric solution further comprises up to 20% by weight of another α-olefin based on said butene-1.

10. The process according to claim 3, wherein said polymeric solution further comprises from 0.5 to 10% by weight of another α-olefin based on said butene-1.

11. The process according to claim 1, wherein said polymeric solution comprising a temperature ranging from 65-85° C. and a dynamic viscosity ranging from 1000-80000 cP is mixed with said aqueous mixture.

12. The process according to claim 1, wherein said aqueous mixture comprises a dynamic viscosity higher than 90 Cp at 30° C.

13. The process according to claim 1, wherein said aqueous mixture comprising at least one organic compound having at least one hydroxyl or epoxy group is prepared in a separated vessel at a temperature ranging from 25-45° C. before mixing said aqueous mixture with said polymeric solution.

14. The process according to claim 1, wherein said aqueous mixture comprises at least one organic compound selected from polyalcohols, hydroxyesters, alkyldiethanolammines, and polyepoxydate oils.

15. The process according to claim 14, wherein said aqueous mixture comprises at least one alkyldiethanolammine of formula R—N (CH$_2$CH$_2$OH)$_2$, wherein R is a C$_{12}$-C$_{18}$ alkyl radical.

16. The process according to claim 15, wherein said alkyldiethanolammine is in a molar fraction in said aqueous mixture ranging from 0.1 to 0.4.

17. The process according to claim 1, wherein said catalyst system comprises a Ziegler-Natta catalyst comprising a Ti-based compound as a solid catalyst component and an Aluminum alkyl compound as an activator.

18. The process according to claim 1, wherein said aqueous mixture and Al are in a molar ratio higher than 2.0.

19. The process according to claim 18, wherein said molar ratio ranges from 2.5 and 4.0.

20. The process according to claim 1, wherein said polymeric solution and said aqueous mixture are mixed in one or more mixing tanks placed in series.

21. The process according to claim 1, wherein said polymeric solution and said aqueous mixture are mixed in a single deactivation apparatus equipped with a sequence of mixing stages.

22. The process according to claim 21, wherein said single deactivation apparatus comprises a stirring shaft comprising from 2 to 20 impellers.

23. The process according to claim 21, wherein said mixing stages are formed along said stirring shaft of the single deactivation apparatus, said mixing stages being produced by rotating each impeller.

24. The process according to claim 22, wherein said impellers comprise radial blades connected to said stirring shaft, said radial blades producing a radial flow within each said mixing stage from rotating said impellers.

25. The process according to claim 21, wherein said polymeric solution and said aqueous mixture are continuously fed into said single deactivation apparatus through an inlet and said polymeric solution and said aqueous mixture flow slowly through said sequence of said mixing stages.

26. The process according to claim 1, wherein downstream from said mixing in at least one mixing stages, said polymeric solution and said aqueous mixture is passed to a separation step, wherein said polymer is separated from any unreacted monomer, and said unreacted monomer is then recovered and re-circulated.

27. The process according to claim 26, wherein said separation step is carried out in at least one volatilization chambers operating at a decreasing pressure.

* * * * *